US 7,882,389 B2

(12) United States Patent
Andres et al.

(10) Patent No.: US 7,882,389 B2
(45) Date of Patent: Feb. 1, 2011

(54) DYNAMIC REASSIGNMENT OF DEVICES ATTACHED TO REDUNDANT CONTROLLERS

(75) Inventors: Michael Andres, Holzgerlingen (DE); Giovanni Cautillo, Stuttgart (DE); Thomas Hess, Bad Liebanzell (DE); Markus Strasser, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 12/273,152

(22) Filed: Nov. 18, 2008

(65) Prior Publication Data
US 2010/0125682 A1      May 20, 2010

(51) Int. Cl.
*G06F 11/00* (2006.01)
(52) U.S. Cl. ............... 714/5; 714/6; 714/7; 714/43; 718/104; 718/105
(58) Field of Classification Search ............... 714/5, 714/6, 43, 7; 718/104, 105
See application file for complete search history.

(56) References Cited

U.S. PATENT DOCUMENTS

| | | | | |
|---|---|---|---|---|
| 5,790,775 A * | 8/1998 | Marks et al. | .................... | 714/9 |
| 5,996,075 A * | 11/1999 | Matena | ........................ | 726/10 |
| 6,073,218 A * | 6/2000 | DeKoning et al. | .......... | 711/150 |
| 6,148,414 A * | 11/2000 | Brown et al. | .................... | 714/9 |
| 6,243,814 B1 * | 6/2001 | Matena | ........................... | 726/3 |
| 6,256,748 B1 * | 7/2001 | Pinson | ........................... | 714/6 |
| 6,330,687 B1 * | 12/2001 | Griffith | ........................... | 714/6 |
| 6,578,158 B1 * | 6/2003 | Deitz et al. | ................... | 714/11 |
| 6,725,331 B1 * | 4/2004 | Kedem | ....................... | 711/117 |
| 6,732,289 B1 * | 5/2004 | Talagala et al. | ................ | 714/6 |
| 6,845,428 B1 * | 1/2005 | Kedem | ....................... | 711/117 |
| 7,444,459 B2 * | 10/2008 | Johnson | ........................ | 711/6 |
| 7,529,972 B2 * | 5/2009 | Zelikov et al. | ................ | 714/10 |
| 7,669,016 B2 * | 2/2010 | Higaki et al. | ................ | 711/154 |
| 7,774,641 B2 * | 8/2010 | Inoue et al. | .................... | 714/5 |
| 2002/0184580 A1 * | 12/2002 | Archibald et al. | ........... | 714/719 |

OTHER PUBLICATIONS

F. Baitinger, et al. "System Control Structure of the IBM eServer Z900". IBM J. Res. & Dev. vol. 46, No. 4/5 Jul./Sep. 2002. pp. 52-535.

* cited by examiner

*Primary Examiner*—Robert Beausoliel
*Assistant Examiner*—Charles Ehne
(74) *Attorney, Agent, or Firm*—Cantor Colburn LLP; Matthew Talpis (57) ABSTRACT

A method for dynamically assigning a plurality of storage devices to a plurality of controllers within a storage unit, the method including: sensing each storage device from the plurality of storage devices; assigning each one of the storage devices to a respective controller from the plurality of controllers; monitoring at least one of each storage device, each controller, and a link between each storage device and the respective controller; upon a failure of at least one of the link, one of the storage devices and one of the controllers, generating a list of components; transmitting the list to another controller; and establishing a new assignment for each of the components on the list. A storage unit and a computer program product are provided.

20 Claims, 5 Drawing Sheets

DYNAMIC REASSIGNMENT OF DEVICES ATTACHED TO REDUNDANT CONTROLLERS

BACKGROUND

1. Field of the Invention

The present invention relates to storage controllers for a server of a computing system, and more specifically, to coordination of multiple controllers.

2. Description of the Related Art

In storage systems of various computing infrastructures, such as server systems, dual storage controllers are often implemented. Generally, only one controller is active at a time. In such cases, one controller is implemented as a master, the other as a slave. Often, only the master controller is active, while the slave controller constantly monitors the master controller. If the master controller fails, the slave controller takes over the operation. In operation, the master controller "owns" all devices attached to the device access bus of the storage system. This means that only the master controller is able to control all devices of this domain.

In some environments, multiple servers are used to provide services. Often, this is due to limitations in bandwidth. For example, consider that in the architecture provided above, a single controller owns all devices attached to the device bus. Therefore, no routing service can be used. The controlled devices can be accessed by either one or by the other controller, and cannot be accessed by both controllers at the same time. In present day embedded control environments, there are no techniques for using more than one active controller.

Thus, what are needed are methods and apparatus to provide for use of more than one controller. Preferably, the methods and apparatus provide for maximum bandwidth within the control domain, while only requiring minor economic investment.

SUMMARY

In one embodiment, the invention includes a method for dynamically assigning a plurality of storage devices to a plurality of controllers within a storage unit, the method including: sensing each storage device from the plurality of storage devices; assigning each one of the storage devices to a respective controller from the plurality of controllers; monitoring at least one of each storage device, each controller, and a link between each storage device and the respective controller; upon a failure of at least one of the link, one of the storage devices and one of the controllers, generating a list of components; transmitting the list to another controller; and establishing a new assignment for each of the components on the list.

In another embodiment, the invention includes a storage unit including a plurality of controllers and a plurality of storage devices, the storage unit equipped with machine readable and machine executable instructions for dynamically assigning at least one of the storage devices to a controller, the instructions including instructions for: sensing each storage device from the plurality of storage devices; assigning each one of the storage devices to a respective controller from the plurality of controllers; monitoring at least one of each storage device, each controller, and a link between each storage device and the respective controller; upon a failure of at least one of the link, one of the storage devices and one of the controllers, generating a list of components; transmitting the list to another controller; and establishing a new assignment for each of the components on the list.

In a further embodiment, the invention includes a computer program product including machine executable instructions stored on machine readable media, the instructions for dynamically assigning at least one storage device from a plurality of storage devices to a controller from a plurality of controllers, the instructions including instructions for: sensing each storage device from the plurality of storage devices; assigning each one of the storage devices to a respective controller; monitoring at least one of each storage device, each controller, and a link between each storage device and the respective controller; upon a failure of at least one of the link, one of the storage devices and one of the controllers, generating a list of components; transmitting the list to another controller; and establishing a new assignment for each of the components on the list.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Disclosed herein are methods and apparatus for increasing bandwidth of devices controlled in a multi-controller system. The methods and apparatus generally take advantage of existing resources and provide substantial increases in throughput. First, in order to provide some context for the teachings herein, exemplary aspects of a processing system are discussed.

Figure 1:
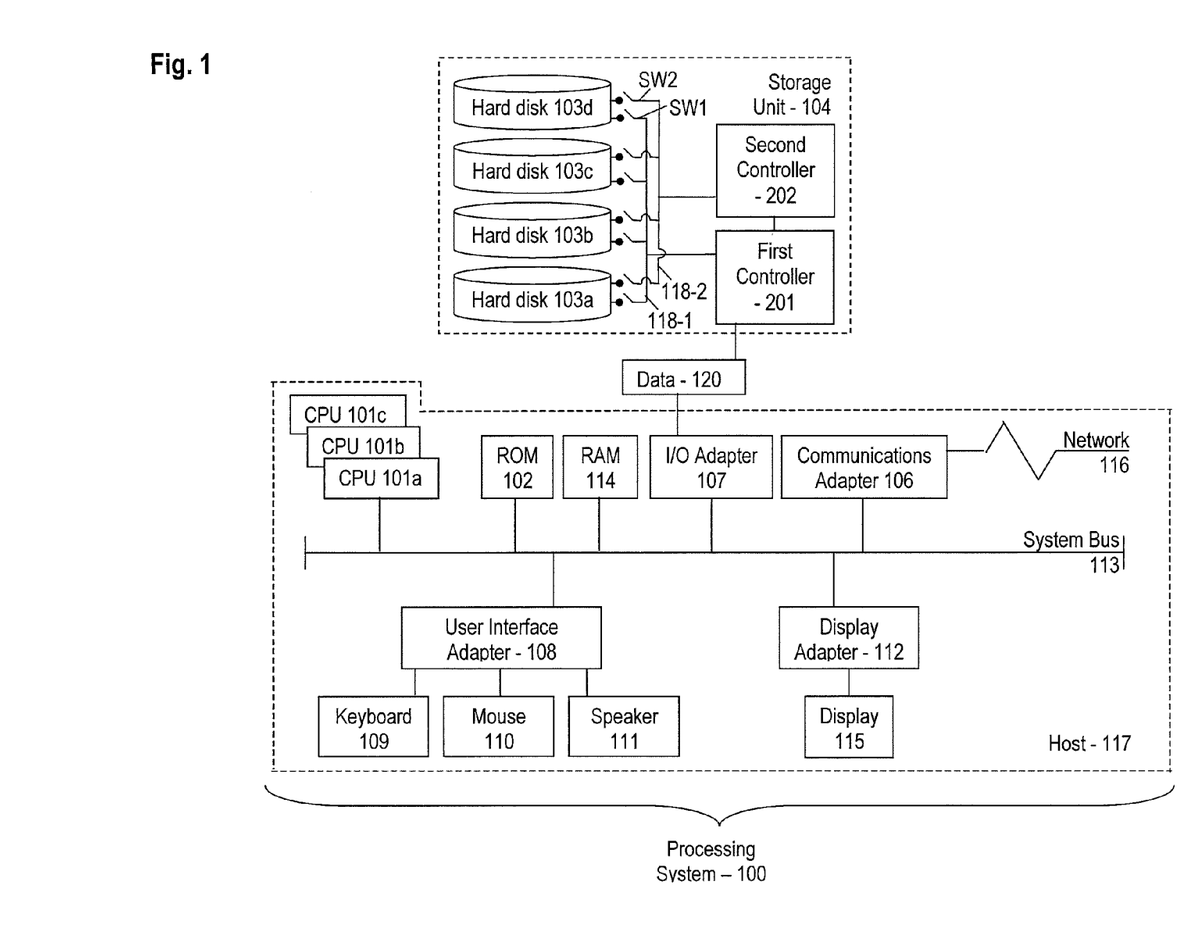
FIG. 1 illustrates one example of a processing system that makes use of a storage system as disclosed herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a storage unit 104. The storage unit 104 may include, for example, a plurality of hard disks 103a, 103b, 103c, 103d, etc., . . . and/or at least another storage unit (not shown) such as a tape drive, an optical drive, magnetic media, a magneto-optical drive, memory or any other similar component. Generally, such devices are referred to herein for convention, as a "storage device." Of course, the "term storage device" is illustrative and not limiting of device functionality, type, purpose, etc, . . . . That is, the term "storage device" should be construed to include any device which is capable of supplying a bus switch, a current switch setting, and a capability to push or pull the switch.

Generally, the storage unit 104 includes a plurality of controllers, shown as first controller 201 and a second controller 202 (but may include additional controllers). Each of the controllers 201, 202 are equipped to manage storing and retrieval of data 120 in the storage unit 104.

The storing and retrieving make use of at least one device access bus 118, shown as a first device access bus 118-1, and a second device access bus 118-2. The controllers 201, 202 may be switchably connected to the device access bus 118 via a switch, SW. The switch, SW, may be implemented in software and/or hardware. In the case of software implementations, the switch, SW, may be implemented as an arbitration protocol. Of course, additional controllers and storage devices may be included in the storage unit 104.

In the example of the storage unit 104 provided in FIG. 1, a plurality of first switches, SW1, and second switches, SW2 are shown. As may be surmised, each switch, SW, provides for coupling a respective storage device to the device access bus 118. For example, closing the first switch, SW1, will couple a respective storage device to the first device access bus 118-1. Similarly, closing the second switch, SW2, will couple a respective storage device to the second device access bus 118-2. In this embodiment, a plurality of storage devices, controllers and device access buses may be implemented. That is, in this embodiment, one example includes n controllers with corresponding n device access buses.

For the embodiment of FIG. 1, in general, only one switch, SW, will be closed at any given time. Accordingly, the respective storage device will be coupled to only one device access bus. In other embodiments, a single switch, SW, is implemented for switching between the first device access bus 118-1 and the second device access bus 118-2 (refer to FIGS. 2-4). This provides an economic implementation of switching, and also limits duplicity of controllers. Suffice to say, a variety of embodiments may be realized for coupling the storage device to a respective device access bus 118 and controller. Accordingly, aspects of switching as shown in FIGS. 1-4 are merely illustrative and are not limiting of the teachings herein.

Generally, the processing system 100 may also include, for example, a network communications adapter 106 that interconnects bus 113 with an outside network 116 enabling data processing system 100 to communicate with other such systems. A screen (e.g., a display monitor) 115 may be connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters may include common protocols, such as the Peripheral Components Interface (PCI). Additional optional input/output devices are shown as connected to system bus 113 via user interface adapter 108 and display adapter 112. A keyboard 109, a pointing device such as a mouse 110, and speaker 111 may all be interconnected to bus 113 via user interface adapter 108, which may include, for example, a Super I/O chip integrating multiple device adapters into a single integrated circuit.

The storage unit 104 may be one storage unit from a plurality of storage units. Accordingly, the storage unit 104 according to the teachings herein may be useful for implementation in redundant systems. The storage unit 104 may, in of itself, provide redundant storage capabilities.

For convenience of reference, a portion of the processing system 100 that provides data 120 to the mass storage 104, as well as other functions, is referred to as a "host" 117. In general, transactions involving storage and retrieval of data 120 are performed via communication between the host 117 and the storage unit 104. Also, the storage unit 104 may provide and/or retrieve data 120 in the form of tracks, blocks, sectors, segments of data, files and in other similar forms. For purposes of discussion, the storage unit 104 is limited to the single storage unit 104 depicted, which includes for separate hard disks, 103*a*, 103*b*, 103*c*, 103*d*.

Thus, as configured in FIG. 1, the system 100 includes processing means in the form of processors 101, storage means including system memory 114 and mass storage means 104, input means such as keyboard 109 and mouse 110, and output means including speaker 111 and display 115. In one embodiment, a portion of system memory 114 and mass storage 104 collectively store an operating system such as the AIX®operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network communications adapter 106 for communicating over a network 116. The network 116 can be a local-area network (LAN), a metro-area network (MAN), or wide-area network (WAN), such as the Internet or World Wide Web, or any other type of network 116.

Users of the system 100 can connect to the network 116 through any suitable communications connection, such as standard telephone lines, digital subscriber line, LAN or WAN links (e.g., T1, T3), broadband connections (Frame Relay, ATM), and wireless connections (e.g., 802.11(a), 802.11(b), 802.11(g)) and others.

Of course, the processing system 100 may include fewer or more components as are or may be known in the art or later devised.

As disclosed herein, the processing system 100 may include machine readable instructions stored on machine readable media (for example, the storage unit 104). As discussed herein, the instructions are referred to as "software." Software as well as data and other forms of information may be stored in the storage unit 104 as data 120.

Each controller 201, 202 of the storage unit 104 may include components such as a cache and a non-volatile storage 203 (i.e., memory, which may include persistent memory) may be included as an aspect of the controller unit 201, or otherwise included within the storage unit 104. Each controller 201, 202 may include machine executable instructions for controlling operation of the storage unit 104. The instructions may be included in firmware (such as within read-only-memory (ROM)) on board the controller 201, 202, as a built-in-operating-system (BIOS) for the storage unit 104 (such as software that loads to memory of the controller unit when powered on), or by other techniques known in the art for including instructions for controlling the storage unit 104.

Recall that in normal operation for a prior art system, the master controller only handles control actions in series. For a slave controller to assume control from a failing master controller, the slave controller must first sense all devices on the storage bus. Only once an inventory of devices has been completed can the slave controller assume duty of the master controller.

In contrast, in some embodiments of the present invention, operational criteria establish that every controller from a plurality of controllers is able to sense storage devices (such as the hard disk 103) unless the link (e.g., the storage bus 118) is interrupted or fails. In addition, each of the controllers 201, 201 has a capability to assign any one or more of the storage devices for exclusive access. Further, each of the controllers 201, 202 is able to detect ownership (i.e., association with a controller) of a selected storage device.

By providing control of storage devices with the plurality of controllers, a number of advantages over the prior art are realized. For example, increased bandwidth of the storage unit 104 is provided. The increased bandwidth within the storage unit 104 (also referred to as a "control domain") is achieved, among other things, by dynamically distributing the assignment of the devices to available controllers 201, 202. Accordingly, increased performance of the storage unit 104 is generally limited by bandwidth of the device access bus 118 and computing power of each controller 201, 202.

In order to prevent collisions or race conditions accessing and controlling the storage devices attached to the device access bus 118, each controller 201, 202 is provided with exclusive access to each device controlled by the respective controller 201, 202. This means that control of each device is assigned between the available controllers and the controller 201, 202 owns the respective storage device.

The invention provided herein also addresses dependency between storage devices. For example, a set of storage devices may define a redundant device. In some embodiments, some of the storage devices are functionally dependent from each other. Accordingly, the dynamic distribution of the storage devices among the plurality of controllers addresses such dependencies.

In general, the teachings herein provide for retaining redundant control and full control is available, even in n mode. In basic implementations, the switch, SW, is used to select the controller 201, 201 which can access a selected storage device (with reference to FIG. 1, a selected hard disk 103*a*, 103*b*, 103*c*, 103*d*). The switch, SW, can be implemented either in hardware or in software. In case of software the switch is implemented as an arbitration protocol. In general, only one switch is needed for switchably connecting each one of the controllers 201, 202 from the plurality of controllers.

Figure 2:
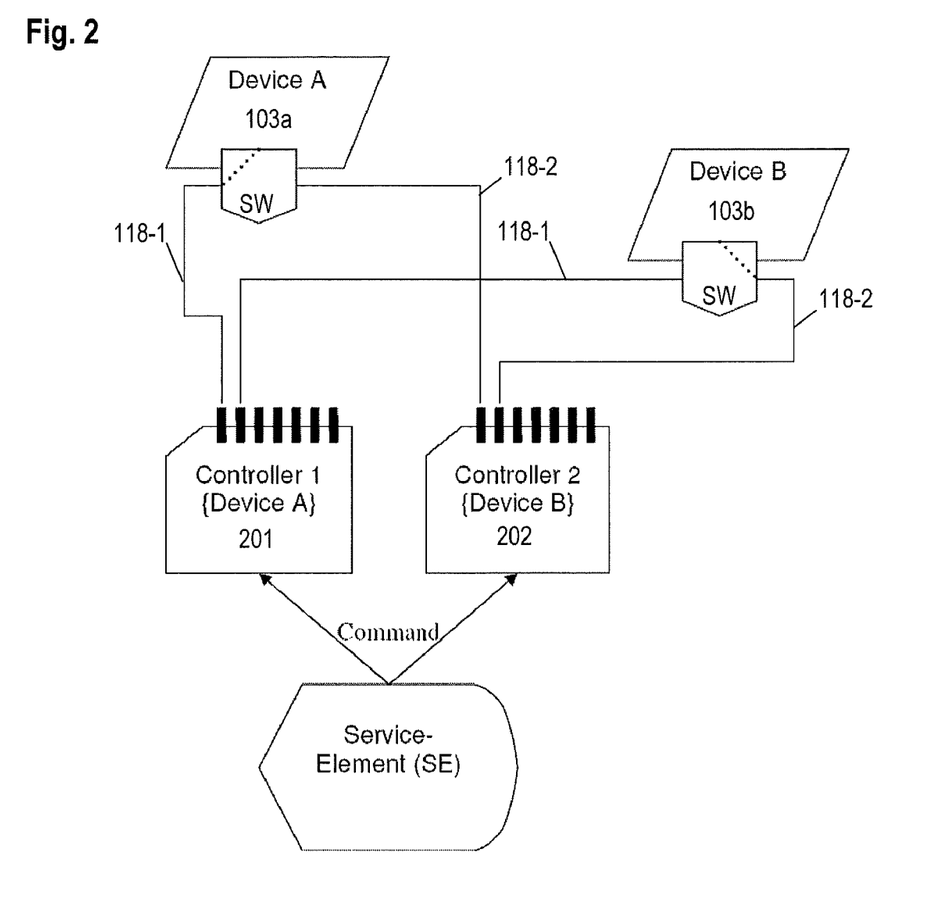
FIGS. 2-4 depict aspects of dynamic allocation of controller devices.
Figure 3:
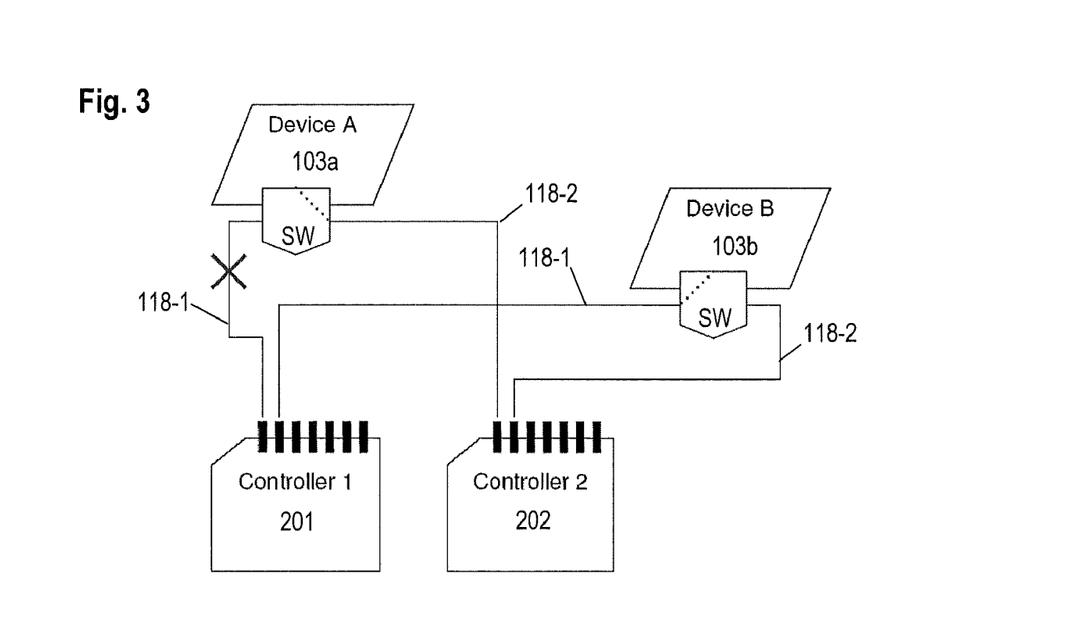
Figure 4:
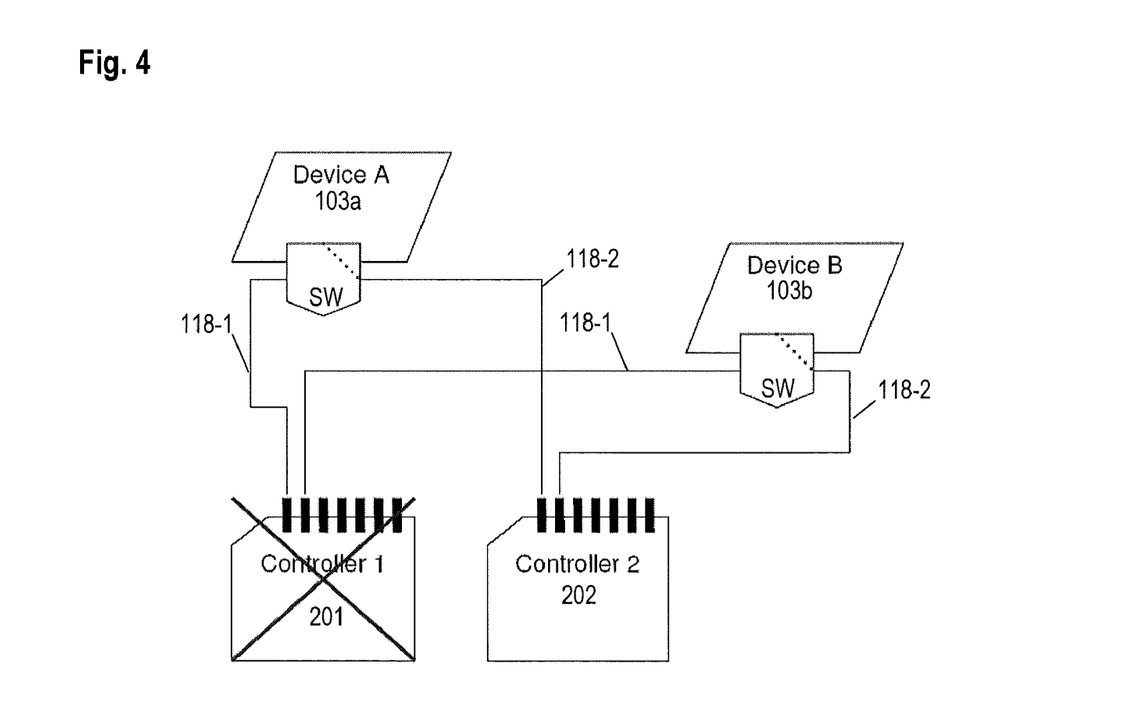

A more detailed explanation of aspects of the invention is now provided with reference to FIGS. 2-4.

After startup of both controllers 201, 202, device assignment is completed. Device assignment generally uses inputs, such as: grouping of dependent devices; load characteristics; and, other set characteristics. Consider first groups of dependent devices.

In some embodiments, storage devices of the same functional group are assigned to the same controller 201, 202. The dependency of the storage devices may be seeded by a dependency table. As an example: assume the following available components: Controller 1 and Controller 2 and Device A, Device B, Device C, Device D (which correlate to for illustration purposes components in FIG. 1 including the first controller 201, second controller 202, hard disk 103*a*, hard disk 103*b*, hard disk 103*c*, and hard disk 103*d*).

Assignment based on Dependency. Consider a situation where Device A and Device B are a redundant pair of storage units and need to be controlled by the same controller. Accordingly, in order to manage dependency requirements, one possible distribution is one where Device A (103*a*) and Device B (103*b*) are assigned to (owned by) Controller 2 (202). Controller 1 (201) owns Device C (103*c*) and Device D (103*d*).

Assignment based on Load Characteristics. Consider a situation where certain storage devices present a heavier workload than others. Assignment of storage devices may be completed according to a weight of each storage device, such as to perform load leveling over the controllers. In one example, consider the same components are the available components, while Device A has a weight of 3, Device B has a weight of 4, Device C has a weight of 1 and Device D has a weight of 2.

In this example, a good distribution according to load includes one where Device A and Device D are assigned to Controller 1 (sum of weights 5); while Device B and Device C are assigned to Controller 2 (sum of weights 5). A poor distribution according to load includes one where Device A and Device B are assigned to Controller 1 (sum of weights 7); while Device C and Device D assigned to Controller 2 (sum of weights 3). In the poor distribution, Controller 1 has two times more workload than Controller 2.

Assignment based on a set of devices sensed by each controller. Consider a situation where certain storage devices do not have a redundant access. Each such storage device is controlled by the controller that sensed the storage device. In this example, consider roughly the same set of components as in the previous examples (Device D not included). In this embodiment, both Controller 1 and Controller 2 sense Device A and Device B. Device C is sensed only by Controller 1, because, for example, a link to Controller 2 is defective). Accordingly, a constraint is realized in that Device C cannot be controlled by Controller 2 and therefore it will be assigned to Controller 1.

Therefore, in this example, possible distribution of storage devices includes one where Device A and Device C are assigned to Controller 1; while Device B is assigned to Controller 2. Initial distribution can be seeded with a fixed table assuming maximum configuration. If this leads to an unbalanced workload in a partially populated system, the rebalance will result in a more balanced distribution depending on the constraints. One additional constraint can be dependent devices.

After the initial distribution of storage devices is selected, each controller 201, 202 generally communicates only with the assigned storage devices. This increases startup performance by the number of available controllers.

In FIG. 2, aspects of a "sharing mode" are depicted. In this example, a service element, SE, sends commands either to Controller 1, 201, or Controller 2, 202, depending on which storage device is needed.

Adding or removing storage devices triggers a rebalance of the links. A reassignment may be based on the criteria specified above. If a link failure is detected, a rebalance of the link is triggered. The controller which detects the change informs a buddy of the change; where a "buddy" refers to another controller from the plurality of controllers. The buddy compares the new state to the old state and triggers a reassignment of the storage device(s) using, for example, one of the mechanisms above. Aspects of link rebalancing are depicted in FIG. 3.

In FIG. 3 (and with reference to FIG. 2), a link from Controller 1, 201, to Device A, 103*a*, fails. Accordingly, Device A, 103*a*, is assigned to Controller 2, 202. Rebalancing is then performed and assigns Device B, 103*b*, to Controller 1, 201.

In the event of failure of a controller 201, 202, all respective storage devices will be controlled by the remaining controller(s). Generally, the time needed to gain full operational control is divided by the number of available controller(s). Consider the following example. First, assume available components include Controller 1 and Controller 2 as well as Device A, Device B, Device C, Device D. In the initial assignment, Controller 1 owns Device A and Device B; while Controller 2 owns Device C and Device D. The failure occurs when Controller 1 fails. Upon the failure, Controller 2 senses and takes ownership control of Device A and Device B, thus owning all devices in this system.

In the prior art, Controller 2 would sense and register four (4) devices. However, according to the teachings herein, the time for regaining control is cut in half. That is, in this example, Controller 2 will sense and register only (2) devices. Aspects of this example are provided in FIG. 4, which depicts "single mode" operation.

In addition, the teachings herein provide for link rebalancing upon addition of another controller. For example, upon addition of another controller to the storage unit 104, after one controller failed, was repaired and is now being reinstalled. This process may trigger a link rebalancing as described above.

Figure 5:
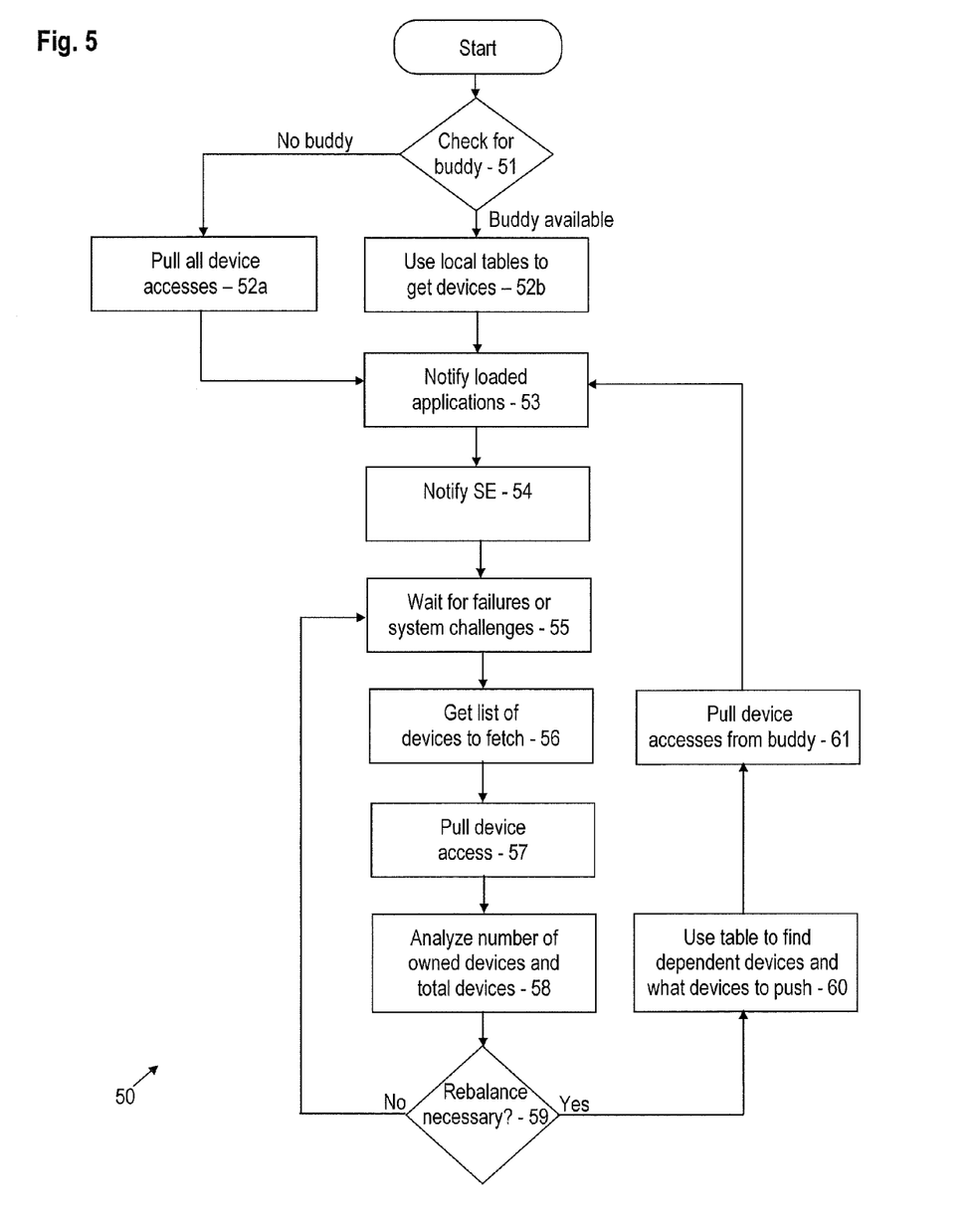
FIG. 5 depicts an exemplary method of the invention.

Now with reference to FIG. 5, a method for dynamic assignment of storage devices 50 is provided. In a first stage 51, a first controller 201 tests for another controller 202, referred to as a "buddy" controller. In a second stage 52, if there is no buddy controller, then the first controller pulls all device accesses to be able to access and control all storage devices. If there is a buddy controller available, then the controllers make use of at least one local table with a predefined distribution of devices to determine what devices to pull (i.e., establish ownership). Of course, this may happen during operational periods, such as during processing, to provide for periodic rebalancing.

In a third stage 53, each controller notifies loaded applications about the owned devices. Accordingly, the applications may sense the device configuration and initialize themselves as well as the storage devices. In a fourth stage 54, the method provides for notifying each service element, SE, about the owned storage devices. As a result of the notification, the service element, SE, queries information about functionalities and an available set of storage devices. In a fifth stage 55, the method provides for monitoring the system state and waiting for device access failures. In general, there are two types of failures, and two system states of concern.

With regard to failures, consider first that a buddy controller may fail. Assuming the buddy controller reboots, the method may wait for a predefined period of time, such as to permit restoration. However, if the buddy controller does not resume operation within this time, the method will generally continues with a sixth stage 56 (or the method may proceed directly to the sixth stage 56 without waiting). A second type of failure may include a situation where the controller detects single or multiple access failures for accessing one of the storage devices. In which case, access failure information is sent to the buddy controller (of course, the controller may receive access failure information from the buddy).

With regard to state change, consider that a buddy controller may be removed by a user. Alternatively, a buddy controller may be added to the storage unit 104.

In a sixth stage 56, the method provides for getting a list of devices to fetch.

With regard to failure of the controller, or a state change, the remaining controller senses the available storage devices and subtracts the already owned storage devices. This list is used as input for a seventh stage 57, where all device access is pulled. Where device access failure occurs, the controller receives a list of the failing storage devices from the buddy controller. This list is used as input for the seventh stage to pull device access.

In an eighth stage 58, a number of owned storage devices and total storage devices are analyzed. In a ninth stage 59, if no rebalance is necessary, the method returns to the fifth stage 55, and monitors the system 100.

If rebalancing is needed, in a tenth stage 60, the method 50 provides for using the table which contains the sets of dependent devices to ensure that all dependent device accesses are owned by the same controller. A list is generated and sent to the buddy. In an eleventh stage 61, all device accesses which are in the list received from the buddy are pulled.

Figure 6:
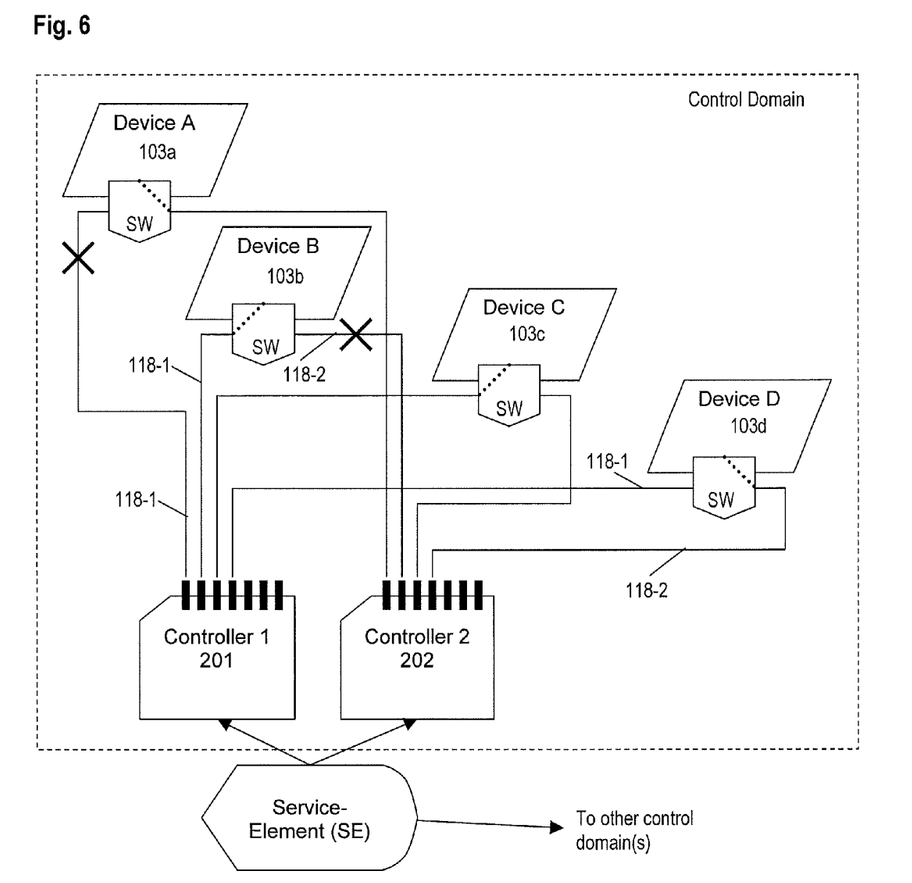
FIG. 6 depicts a further embodiment, and certain advantages provided herein.

Having thus disclosed aspects of the invention, further aspects of embodiments are provided. In some embodiments, the storage unit 104 and each controller may include at least one of a processor, a read only memory (ROM), random access memory (RAM), a non-volatile storage and the like. Accordingly, at least one of the storage unit 104 and the controller 201, 202 may include machine executable instructions for performing the method 50 provided herein. A storage device from the storage unit (e.g., one of the hard disks 103) may be used to provide storage of the instructions. Now with reference to FIG. 6, consider further aspects of implementations of the teachings herein. In this example, if there are multiple devices (A;B;C;D) attached to a pair of redundant controllers 201, 202, the system control stays redundant if a storage device has a broken link, as denoted by the "X" notations located on the device access bus. In present day implementations, the controller pair is not redundant anymore since one storage device cannot be controlled anymore from the side where the link is broken. However, in the embodiments provided herein, when the redundant controller pair controls "n" devices (in the example provided herein, n=4) where several links are broken, the devices can be assigned in such order so all storage devices may still be controlled and the load can be fully shared. Further, the redundant control path to the control domain is still available. In contrast, for the prior art methods and apparatus, one could not control the complete hardware compliment anymore since either side (i.e., both controllers) cannot access all of the hardware provided in the machine. Accordingly, the teachings herein provide for various advantages since the performance of the system as a whole is not impacted by several defects and a repair can be deferred longer without an impact for the costumer. This adds robustness to the system design.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, stages, operations, elements, and/or components, but do not preclude the presence or addition of one or more other features, integers, steps, operations, element components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamically assigning a plurality of storage devices to a plurality of controllers within a storage unit, the method comprising:
   sensing each storage device from the plurality of storage devices;
   assigning each one of the storage devices to a respective controller from the plurality of controllers;
   monitoring at least one of each storage device, each controller, and a link between each storage device and the respective controller;
   upon a failure of at least one of the link, one of the storage devices and one of the controllers, generating a list of components;
   transmitting the list to another controller; and
   establishing a new assignment for each of the components on the list.

2. The method as in claim 1, wherein establishing a new assignment comprises determining a dependency of each of the storage devices.

3. The method as in claim 1, wherein establishing a new assignment comprises determining a workload of each of the storage devices.

4. The method as in claim 1, wherein establishing a new assignment comprises sensing each of the storage devices on the list.

5. The method as in claim 1, further comprising including at least one constraint in the list.

6. The method as in claim 1, wherein the assigning is according to a predetermined table of assignments.

7. The method as in claim 1, wherein the generating, transmitting and establishing is initiated by at least one of an addition and a removal of another controller.

8. A storage unit comprising a plurality of controllers and a plurality of storage devices, the storage unit equipped with machine readable and machine executable instructions for dynamically assigning at least one of the storage devices to a controller, the instructions comprising instructions for:
   sensing each storage device from the plurality of storage devices;
   assigning each one of the storage devices to a respective controller from the plurality of controllers;
   monitoring at least one of each storage device, each controller, and a link between each storage device and the respective controller;
   upon a failure of at least one of the link, one of the storage devices and one of the controllers, generating a list of components;
   transmitting the list to another controller; and
   establishing a new assignment for each of the components on the list.

9. The storage unit as in claim 8, wherein the instructions are stored within at least one of the storage unit and at least one controller from the plurality of controllers.

10. The storage unit as in claim 8, wherein the instructions are stored in at least one of read-only-memory (ROM), a cache, a non-volatile storage and a built-in-operating-system (BIOS).

11. The storage unit as in claim 8, wherein the plurality of storage devices comprises at least one of a hard disk, a tape drive, an optical drive, magnetic media, a magneto-optical drive and memory.

12. The storage unit as in claim 8, wherein the link comprises a communications bus.

13. The storage unit as in claim 8, further comprising instructions for communicating data to and from a processing system.

14. The storage unit as in claim 8, further comprising instructions for switchably connecting each storage device with the respective controller.

15. A computer program product comprising machine executable instructions stored on machine readable media, the instructions for dynamically assigning at least one storage device from a plurality of storage devices to a controller from a plurality of controllers, the instructions comprising instructions for:
   sensing each storage device from the plurality of storage devices;
   assigning each one of the storage devices to a respective controller;
   monitoring at least one of each storage device, each controller, and a link between each storage device and the respective controller;
   upon a failure of at least one of the link, one of the storage devices and one of the controllers, generating a list of components;
   transmitting the list to another controller; and
   establishing a new assignment for each of the components on the list.

16. The computer program product as in claim 15, wherein the instructions are stored within at least one of the storage unit and at least one controller from the plurality of controllers.

17. The computer program product as in claim 15, wherein the plurality of storage devices comprises at least one of a hard disk, a tape drive, an optical drive, magnetic media, a magneto-optical drive and memory.

18. The computer program product as in claim 15, wherein the link comprises a communications bus.

19. The computer program product as in claim 15, further comprising instructions for communicating data to and from a processing system.

20. The computer program product as in claim 15, further comprising instructions for switchably connecting each storage device with a respective controller.

* * * * *